United States Patent
Eager et al.

(10) Patent No.: US 6,868,452 B1
(45) Date of Patent: Mar. 15, 2005

(54) METHOD FOR CACHING OF MEDIA FILES TO REDUCE DELIVERY COST

(75) Inventors: Derek L. Eager, Saskatoon (CA); Michael C. Ferris, Madison, WI (US); Mary K. Vernon, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 626 days.

(21) Appl. No.: 09/633,722

(22) Filed: Aug. 7, 2000

Related U.S. Application Data
(60) Provisional application No. 60/147,569, filed on Aug. 6, 1999.

(51) Int. Cl.[7] .......................... G06F 15/16; H04N 7/173
(52) U.S. Cl. ........................................ 709/231; 725/93
(58) Field of Search ................................ 709/203, 217, 709/226, 231, 235; 725/87, 90, 91, 92, 93, 97, 101, 103

(56) References Cited

U.S. PATENT DOCUMENTS

| | | | | |
|---|---|---|---|---|
| 5,530,754 A | * | 6/1996 | Garfinkle ........................ | 725/8 |
| 5,550,577 A | * | 8/1996 | Verbiest et al. ................ | 725/92 |
| 5,568,180 A | * | 10/1996 | Okamoto ....................... | 725/92 |
| 5,684,963 A | * | 11/1997 | Clement ........................ | 705/26 |
| 5,701,582 A | * | 12/1997 | DeBey .......................... | 725/103 |
| 5,898,456 A | * | 4/1999 | Wahl ............................. | 725/91 |
| 5,926,205 A | * | 7/1999 | Krause et al. ................ | 725/103 |
| 6,018,359 A | * | 1/2000 | Kermode et al. ............. | 725/101 |
| 6,502,139 B1 | * | 12/2002 | Birk et al. .................... | 709/233 |
| 6,543,053 B1 | * | 4/2003 | Li et al. ........................ | 725/88 |
| 6,557,030 B1 | * | 4/2003 | Hoang .......................... | 709/217 |
| 6,564,380 B1 | * | 5/2003 | Murphy ........................ | 725/86 |
| 6,601,136 B2 | * | 7/2003 | Gunaseelan et al. ........ | 711/112 |
| 6,647,425 B1 | * | 11/2003 | Chaddha ...................... | 709/233 |
| 6,665,726 B1 | * | 12/2003 | Leighton et al. ............. | 709/231 |

FOREIGN PATENT DOCUMENTS

EP        609936 A2  *  8/1994  ............ H04N/7/08

OTHER PUBLICATIONS

Nussbaumer et al, "Networking requirements for interactive video on demand", Selected Areas in Communications, IEEE Journal on, vol.: 13, Issue: 5, Jun. 1995, pp.: 779–787.*

Hua, K et al, "Skyscraper Broadcasting: A New Broadcasting Scheme for Metropolitan Video–on–Demand Systems", Proc. of ACM SIGCOMM, Sep. 1997.*

D. L. Eager et al, "Dynamic skyscraper broadcasts for video–on–demand", In Proceedings of the 4–th International Workshop on Advances in Multimedia Information Systems (MIS '98), 18–32, 1998.*

*A Low Bandwidth Broadcasting Protocol for Video on Demand*, Jehan–Francois Paris et al., Int'l Conference on Computer Communication and Networks (ICCCN), Oct. 1998.

(List continued on next page.)

Primary Examiner—William Cuchlinski, Jr.
Assistant Examiner—Yemane M. Gerezgiher
(74) Attorney, Agent, or Firm—Quarles & Brady LLP

(57) ABSTRACT

Improvement on delivery of continuous media programs, such as video, divides the programs into prefixes and suffixes of data. One of these groups, or other groups associated with alternate on-demand data streaming, may be stored at a remote location, while the other of the groups may be stored at a plurality of regional locations. Accordingly, when the media program is ordered by a plurality of clients, a portion of the program will be broadcast from the regional server, while the other portion of the program will be transmitted from the remote server. The prefixes and suffixes are chosen so as to maximize the efficiency of data transfer taking into account the cost of storing the data as well as bandwidth costs.

20 Claims, 3 Drawing Sheets

OTHER PUBLICATIONS

*Efficient Broadcasting Protocols for Video on Demand*, Jehan–Francois Paris et al., Proc. Mascots '98, Montreal, Jul. 1998.

*Efficient Schemes for Broadcasting Popular Videos*, Lixin Gao, et al.

Metropolitan area video–on–demand service using pyramid broadcasting, S. Viswanathan et al., Multimedia Systems (1996) 4: 197–208.

*A Permutation–Based Pyramid Broadcasting Scheme for Video–on–Demand Systems*, Charu C. Aggarwal et al.

*Design and Analysis of Permutation–Based Pyramid Broadcasting*, Charu C. Aggarwal et al., U of S Computer Science, RC 20620, Nov. 8, 1996.

*Tailored transmissions for efficient Near–Video–On–Demand service\**, Yitzhak Birk et al.

Reducing I/O Demand in Video–On–Demand Storage Servers, Leana Golubchik et al., SIGMETRICS '95 Ottawa, Ontario, Canada.

On Optimal Piggyback Merging Policies for Video–On–Demand Systems, Charu Aggarwal et al., SIGMETRICS '96, 5/96 PA.

*Adaptive Piggybacking Schemes for Video–on–Demand Systems*, Charu C. Aggarwal et al., RC 20635 (Nov. 19, 1996) IBM Research Division.

Merging video streams in a multimedia storage server: complexity and heuristics, Siu–Wah Lau et al., Multimedia Systems (1998) 6:29–42.

*Patching: A Multicast Technique for True Video–on–Demand Services*, Kien A. Hua et al., ACM Multimedia 98—Electronic Proceedings.

*Improving Video–on–Demand Server Efficiency Through Stream Tapping*, Steven W. Carter, et al., Proc. Int'l Conf. On Computer Communication and Networks (ICCCN), Las Vegas, Sep. 1997, pp. 200–207.

*Stream Tapping: a System for Improving Efficiency on a Video–on–Demand Server*, Steven w. Carter et al., UCSC-CRL–97–11, Nov. 2, 1997.

*Supplying Instantaneous Video–on–Demand Services Using Controlled Multicast*, Lixin Gao et al.

*Optimal Patching Schemes for Efficient Multimedia Streaming\**, Subhabrata Sen et al.

*Dynamic batching policies for an on–demand video server*, Asit Dan et al., Multimedia Systems (1996) 4:112–121.

*On Optimal Batching Policies for Video–on–Demand Storage Servers*, Charu C. Aggarwal et al., IEEE Multimedia Computing & Systems Conf., Hiroshima, Japan, Jun. 1996.

*Group–Guaranteed Channel Capacity in Multimedia Storage Servers*, Athanassios K. Tsiolis et al., SIGMETRICS 1997 Conference.

*Networking Requirements for Interactive Video on Demand*, Jean–Paul Nussbaumer et al., IEEE Journal on Selected Areas in Communications, vol. 13, No. 5, Jun. 1995.

*Hierarchical Storage Management in a Distributed VOD System*, David W. Brubeck et al., 1996 IEEE MultiMedia, pp. 37–72.

*Cost–Based Program Allocation for Distributed Multimedia–on–Demand Systems*, Chatschik C. Bisdikian et al., IEEE Multi–Media, pp. 62–72, 1996.

*Proxy Prefix Caching for Multimedia Streams*, Subhabrata Sen et al., CMPSCI Technical Report 98–27, University of Massachusetts, pp. 1–26.

\* cited by examiner

FIG. 6

METHOD FOR CACHING OF MEDIA FILES TO REDUCE DELIVERY COST

CROSS-REFERENCE TO RELATED APPLICATIONS

This application is based on provisional application 60/147,569 filed Aug. 6, 1999 and claims the benefit thereof

STATEMENT REGARDING FEDERALLY SPONSORED RESEARCH OR DEVELOPMENT

This invention was made with the United States government support awarded by the following agencies:

NSF3 9975044

The United States has certain rights in this invention.

BACKGROUND OF THE INVENTION

The present invention relates to methods of transmitting "streaming data", such as video or audio content, to multiple clients. In particular, the present invention provides a method of reducing the delivery costs associated with transmitting such data by selectively caching some of the content at regional servers close to the clients.

"Streaming data" is data that a client will process sequentially as it is received during a transmission, under a timeliness constraint requiring a minimum rate of progress in the reception of the data.

Examples of continuous media programs are video and audio programs, including movies, television shows, news clips, product advertisements, medical or recreational information or educational programs. This list of examples is not exhaustive.

"On-demand delivery" of streaming data is the delivery of streaming data triggered by client requests for that data, rather than simply by reaching a previously defined point in time. For example, in a video on-demand (VOD) system a customer might be able to request a video program at any time, with the expectation that the video would be viewable within a small time following the request.

Programs of streaming data may be stored at and transmitted from a server to clients via phone lines, cable, broadcast radio, satellite links or other media. The server may be a single machine or a set of machines that together provide a service.

For popular programs, many new requests may arrive at the server during a delivery period. In response to these requests, the server may make a separate transmission of data to each consumer. This approach is simple and works with standard receiving devices (e.g., television sets) but has the disadvantage of requiring a large number of transmission channels, one for each starting time where a request has been received. For this simple scheme, the bandwidth (e.g., number of channels) required to serve requests increases linearly with the number of starting times required and thus does not scale well to large numbers of starting times where requests will be received.

In order to reduce the bandwidth used to transmit the popular programs, the server might employ one of the multicast transmission methods described below. A key observation about each of these multicast methods is that if the program is popular, the server transmits earlier portions of each popular program more frequently than later portions of the program.

Piggybacking

Figure 2:
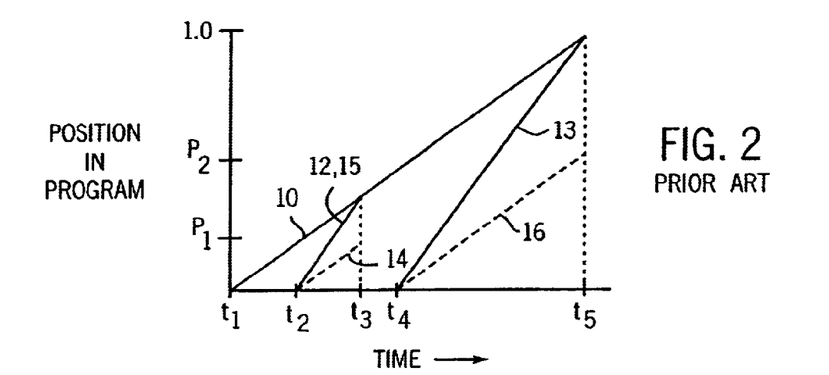
FIG. 2 is a graph plotting program position vs. time for transmissions under the prior art patching and piggybacking techniques as described above.

Referring to FIG. 2, the transmission of each data stream describes a line on a graph plotting sequential position in the data stream (for example a frame number in a video transmission) against time. Sequential position as shown varies between zero and one where one indicates completion of the data stream.

A primary data stream 10 requested at delivery time $t_1$ is multicast at some base rate (indicated by the slope of the line extending from time $t_1$) that allows the client to view the data without interruption once playback begins.

At a later time $t_2$ the server may receive a second request for the same program. Instead of transmitting an entirely new data stream, the technique of piggybacking responds to this second request by transmitting an accelerated data stream 12. This accelerated data stream is actually a different encoding of the program, such that the slightly fewer frames are created for each minute of the program. Data stream 12 delivers the same number of frames per minute as stream 10 but because these frames cover more than one minute of the program, the client receiving stream 12 progresses through the program at a rate that is imperceptibly faster (e.g., 5% faster) than the client who receives simple data stream 10. As a result of these differences in viewing rate, the data streams 10 and 12 will intersect at time $t_3$ and the accelerated data stream 12 may terminate, saving the bandwidth that would have been required for its continuation. After data streams 10 and 12 have merged, the continuation of stream 10 can be merged with an earlier or later stream for the same program, by accelerating stream 10 or by accelerating the later stream, respectively.

Skyscraper Broadcasts

Figure 3:
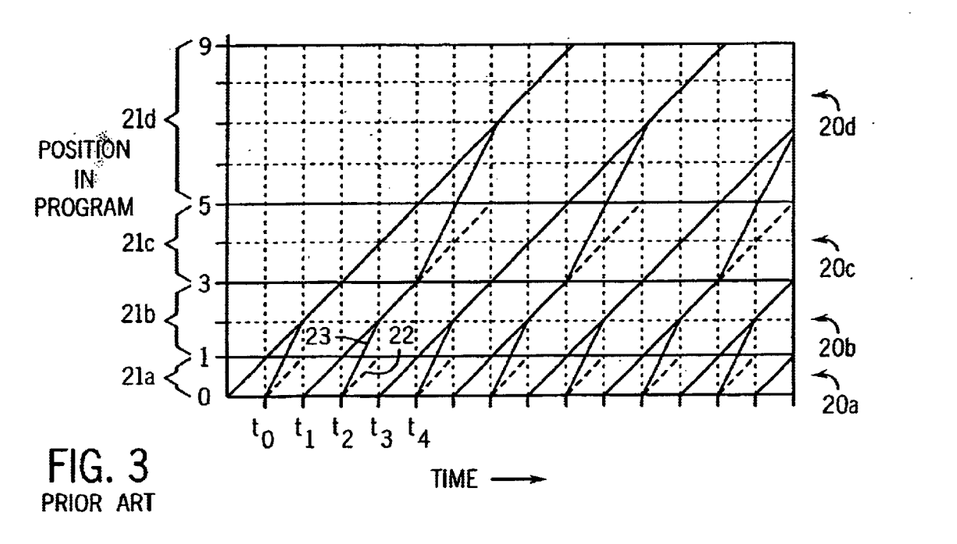
FIG. 3 is a graph similar to that of FIG. 2 showing the prior art technique of skyscraper broadcasts described above.

Referring to FIG. 3, a second way of multicasting streaming data divides the program into a plurality of "channels" 20a through 20d with each successive channel repeatedly transmitting a different time segment 21a–21d of the program. Thus, for example, channel 20a represented by a row of the chart of FIG. 3 may repeatedly transmit the first one-minute of the program, thus, from zero to one minute. Channel 20b in contrast may repeatedly transmit from minutes 2 and 3 of the program while channel 20c may transmit minutes 4 and 5 of the program, each of channels 20b and 20c repeating their segment on a two-minute basis. Channel 20d may transmit minutes 6–9.

Under this system, a client wishing to receive the program at time $t_1$ waits until the next delivery time on an even minute increment (i.e., $t_2$) and then listen to channel 20a to receive the first minute of the program indicated by stream 22. The client's receiver begins displaying that first minute and simultaneously records channel 20b providing segment 21b of minutes 1–3 of the program. At the conclusion of the stream 22 at time $t_3$, the client's receiver begins playing the previously recorded portions of stream 24 of segment 21b at its beginning while continuing to record segment 21b on channel 20b. At time $t_4$, one minute later, the client's receiver begins recording channel 20d in preparation for the termination of the segment on channel 20c two minutes later. In this way, by simultaneously recording and playing different channels, a continuous program may be assembled starting at any even minute interval. This method is termed "skyscraper broadcasts" referring generally to the way the complete program is assembled from segments of different sizes which when stacked like blocks from smallest to largest resemble the profile of a sky scraper.

It can be seen from this simple example that with skyscraper broadcasts, four channels may provide a nine-minute program starting every minute. If separate data streams were used for each new start time, nine channels would be required so it is apparent that skyscrapering can significantly reduce the bandwidth required for regular transmissions. It should be appreciated that the bandwidth savings is even greater for longer running programs; for example, a two-hour movie can start every minute using just 12 skyscraper channels (with the number of minutes delivered on each channel having the pattern 1,2,2,4,4,8,8, ... ), rather than the 120 channels that would be required if a separate data stream were used for each new start time.

Dynamic Skyscraper Broadcasts

When multiple programs must be delivered, a variation on the skyscraper broadcast system termed "dynamic skyscrapering" may be used to provide even greater transmission efficiencies. Dynamic skyscrapering recognizes that the segment transmissions distributed among different channels for a given program may be organized into clusters that form a complete program thread with a given transmission of the last program segment on the final channel (i.e., on channel $20d$ in FIG. 3). For example, in FIG. 3, all segment transmissions that would be received by clients arriving between time 0 and time $t_2$ form a cluster. The boundary of a cluster exhibits the general merging that occurs in skyscrapering where many multicasts of earlier data segments ultimately merge to a single stream represented by the final segment in the final channel of the transmission.

A significance of clusters is that once a first segment transmission of a cluster begins on the first channel, later requests for start times within the cluster do not require additional delivery of the final segment. Thus each cluster represents a single complete showing of the program and the next cluster represents a new showing.

Dynamic skyscrapering recognizes that at the interface between clusters, program material may be readily changed and exploits this fact when multiple programs are being transmitted, by sharing uncommitted clusters among programs. Specifically, a number of transmission channels are organized into blocks, with each block dedicated to delivering skyscraper clusters. The clusters in the different blocks may be staggered in starting times. As requests for particular programs come in, they are assigned on a first-come, first-serve basis, first to any existing cluster currently transmitting the desired program and, if there are none, to any available cluster that has not previously been assigned. In this way, the clusters in each block of channels are assigned to programs in response to client requests, rather than being dedicated to a particular program. The staggering maximizes the availability of unassigned clusters and reduces the maximum waiting time when clusters are not available.

Patching

Patching, like the skyscraper technique, assumes that the client receiver may simultaneously store and playback portions of the program and may follow a given storage and playback scheme. The technique of will be explained by referring again to FIG. 2.

Again assume a primary data stream 10 is requested by a first client at delivery time $t_1$ and delivered at a rate equal to the rate at which the client reviews the primary data stream 10. A request for the same program by a second client at time $t_2$ causes the allocation of a second data stream 14 having the same data rate as primary data stream 10 but starting at time $t_2$ from the beginning of the program.

At time $t_2$ the second client receiver also begins recording the ongoing transmission of the primary data stream 10 from stream position $p_1$. The receiver is thus receiving data at a higher rate of a composite data stream 15 equal to the sum of the rates of the data streams 10 and 14. This composite stream merges with the primary data stream 10 at time $t_3$ at which time data stream 14 (being part of composite data stream 15) may be terminated saving the bandwidth that would have been required if data stream 14 had continued for the length of the program without an attendant time distortion.

At a fourth time $t_4$, a third client may request the media stream and composite data stream 13 may be created from the ongoing primary data stream 10 and a new data stream 16. This composite data stream 13 then merges with primary data stream 10 and data stream 16 is terminated. Additional client requests may be accommodated in this manner until the time when a composite data stream will no longer be able to merge with the primary data stream 10 before its conclusion, at which time a new primary data stream 10 is started. (Additionally, variants of patching may start a new primary stream for a client that could merge with an existing primary, as a performance optimization.)

Regional Caching

Any given server that may transmit streaming data to many clients may become overloaded if the client population becomes very large. Furthermore, the transmission medium used to transmit the data from the server to the clients may not have sufficient bandwidth to accommodate all of the transmissions that clients request. To alleviate these problems, or to otherwise improve the service to clients, a given program may be stored (i.e., cached) at another server, hereafter termed a "regional server", that handles some of the requests from a collection of clients. Typically the regional server is located closer to the clients than the original server, hereafter referred to as the "remote server". If the regional server has cached the program requested by a client, the regional server may either transmit the program to the client, or alternatively, may forward the client request to the remote server or to another server that can deliver the program to the client.

BRIEF SUMMARY OF THE INVENTION

The present invention provides streaming data caching methods that provide better service to clients (e.g., reduced delivery cost or reduced load on the remote server) than that of previously existing approaches, when some of those streaming data programs are delivered using multicast stream merging and are requested frequently enough for stream merging to occur.

The present inventors have recognized that when multicast stream merging is employed, the server transmits a unit of data (e.g., a video frame) that occurs earlier in the program more frequently than a same sized unit of data (e.g., another frame) that occurs later in the program. It is also recognized that the unit of data that occurs later in the program has more clients receiving each transmission of the data unit, on average, than the unit of data that occurs earlier in the program. The number of clients listening to a transmission, on average, will also increase if the server has a bigger client population for the program. Accordingly, it has been determined that in some cases it is desirable to break a program into a smaller prefix and the remaining larger suffix, and to allocate the prefix to one or more regional servers to improve service to clients, while allocating the suffix to the remote server to reduce storage costs and improve client cost-sharing.

In accordance with a first aspect of the invention, a method is provided for improving the efficiency of transmitting a streaming data program on-demand to multiple consumers in response to requests for the data. The program data is split into a prefix and suffix as a function of at least 1) costs associated with storing the prefix at a regional storage location and 2) costs of transmitting the suffix from the remote storage-location. Either the prefix or the suffix may be empty. The prefix is stored in the regional storage location, and the suffix is stored in the remote storage location.

In accordance with another aspect of the invention, it is appreciated that a given regional server may have a limited amount of cache storage space. When it is desired to have the capability of transmitting a plurality of media programs on-demand, the data comprising these programs may be divided and allocated to the regional and remote servers. It is appreciated that some media files will be more popular than others and, accordingly, in some cases it is desirable to store larger portions of less popular programs regionally so as to reduce the bandwidth costs associated with the transmission of these programs, realizing that the bandwidth cost associated with sending a program from the remote server to only a few clients may be the same as the bandwidth cost for sending the same program to a multitude of clients. When regional cache storage space is limited, it will often be more cost effective to store an initial prefix of many of the more popular programs as compared with storing fewer of the more popular entire programs that can fit in the cache. The suffixes of the more popular programs may then be cached at the remote server.

In accordance with yet another aspect of the invention, an optimization model minimizes a specified modifiable delivery cost function over a set of possible selections of program data that could be stored in each regional server cache. Accordingly, the possible selections of program data that can be stored at each regional server are any collection of program prefixes and entire programs, such that the prefixes are all of a specified size and the collection of prefixes and entire programs fits in the regional storage space.

The foregoing may not apply to all embodiments of the inventions and is not intended to define the scope of the invention, for which purpose claims are provided. In the following description, reference is made to the accompanying drawings, which form a part hereof, and in which there is shown by way of illustration, and not by way of limitation, a preferred embodiment of the invention. Such embodiment also does not define the scope of the invention and reference must be made therefore to the claims for this purpose.

DETAILED DESCRIPTION OF THE INVENTION

A. Technique for Video-On-Demand

The example of video-on-demand will be described, it being understood that the invention applies also to other types of streaming data. Further, the invention will be described with respect to a remote and regional server coordinating to deliver the video program. It should be recognized that the term "video program" as used herein is intended to be inclusive of a variety of circumstances, including, for example, an independent entity such as a movie or television show, a piece of a more complex multimedia presentation, or a single layer of a program that has been encoded using base and enhancement layers".

Figure 1:
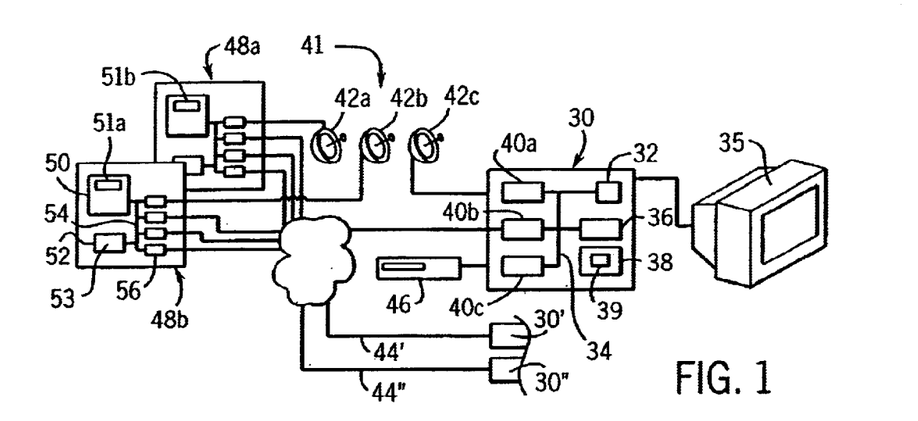
FIG. 1 is a block diagram of a multicast transmission system and receiving systems suitable for practice of the present invention showing connections of a remote and regional server through a variety of links to each other and to a representative one of multiple consumers.

Referring now to FIG. 1, a consumer receiver 30, such as a set-top box at a consumer's home, connects via an output port 32 with a television monitor 35 through which a consumer may view streamed video data.

Output port 32 receives data by an internal bus 34 from a processor 36 that may execute a stored receiver program 39 (as will be described below) contained in memory 38 also connected to the internal bus 34. The internal bus 34 also connects to one or more input/output ("I/O") ports 40a through 40c which may provide for the receipt of streaming data I/O port 40a through 40c may be connected, for example, singly or multiply to any of a variety of transmission media 41 including satellite antenna 42a–c, ground line 44 such as telephone line or cable, or to a fixed media player 46, any of which may provide for one or more data streams.

A regional server 48b holds a portion 51a of a video program in memory 50 which will be formatted into data streams by processor 52 executing a stored server program 53 (described below) also stored in memory 50. The processor 52 and memory 50 communicate with each other over an internal bus 54 and also with multiple I/O ports 56 which may communicate via the previously described transmission media 41 and devices to multiple receivers 30, 30' and 30".

The particular communication protocols between the regional server 48b and the receivers 30 are not critical provided they allow for broadcasting or multicasting in multiple logical channels (which may but need not be physical channels). Additionally, FIG. 1 shows the end points of the transmission as the server and the client viewer. However, the transmission techniques could be used in other places. For example, the "client end" could be a regional proxy, or simply a machine that processes but does not display the material. Similarly, the server end could be a regional proxy that doesn't store the entire video at any point in time (if, for example, it itself is receiving it from somewhere).

Regional server 48b may be connected with remote server 48a of identical design holding in memory 51b other portions of the video program and communicating them either to server 48b or directly to consumer receiver 30 as will be described.

The preferred embodiment of the invention improves over a prior art formatting technique termed "dynamic skyscrapering" described in a paper by the present inventors entitled Dynamic Skyscraper Broadcast for Video-On-Demand, presented at the Fourth International Workshop on Multimedia Information Systems (MIS'98), Istanbul, Turkey, September 1998, by Derek L. Eager and Mary K. Vernon.

Figure 4:
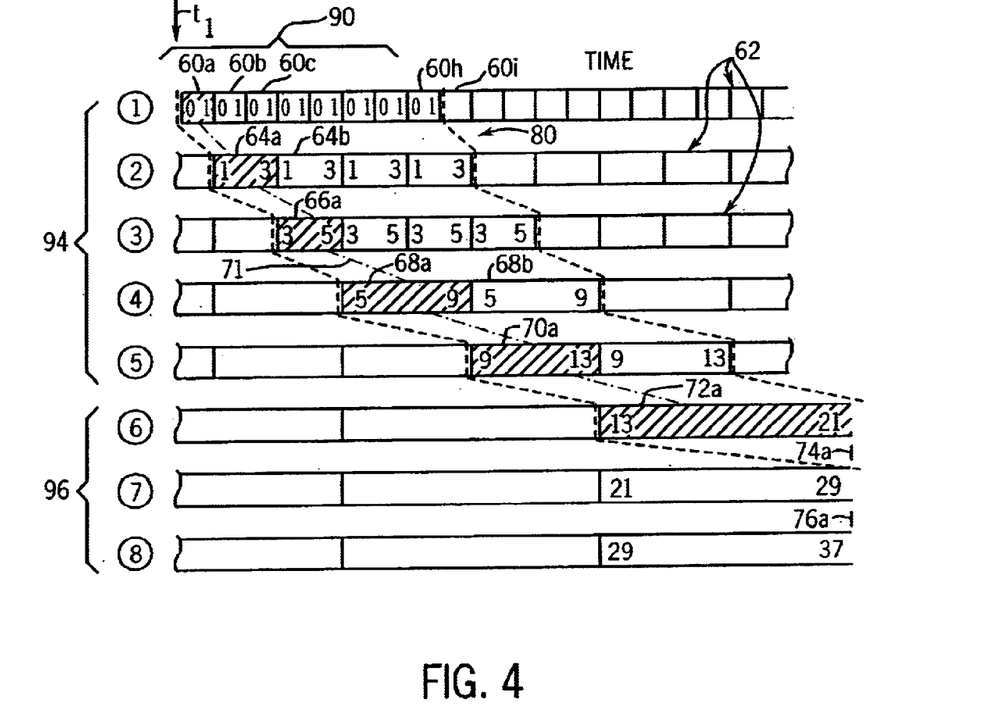
FIG. 4 is a graphical representation of a skyscraper delivery system in accordance with the preferred embodiment showing different channels on the vertical axis and time on the horizontal axis and further showing the breaking up of a continuous media program into multiple segments distributed over different channels which may assembled into program threads to recreate the entire continuous media program, each program thread tying within a given cluster, and wherein the multiple segments are broken up into a prefix and a suffix.

Referring to FIG. 4, in this technique, a video program is broken into a variety of segments 60, 64, 66, 68, 70, 72, 74, and 76 of progressively greater length. A variety of different sequences of segments may be used but, in the present example, the sequence of relative sizes is [1,2,2,4,4,8,8,8], that is segments 64 and 66 are twice as long as segment 60, segments 68 and 70 are four times as long as segment 60 and so forth.

Each segment is repeatedly broadcast on a different channel 62. Thus, the first segment 60 is repeatedly broadcast on a first channel 62 and spans, for example, the first minute of video data from start to minute one as indicated. At the conclusion of the broadcast of one segment 60a, it is repeated or another segment of similar size broadcast in its place (as segments 60b, 60c and so forth).

The second segment 64a comprising the next two minutes of broadcast video (i.e., from minutes one to three) is broadcast on a second channel 62. This segment 64 is also repeated (as segments 64b, 64c, and so forth) with the boundaries between segments 64 aligned with every other boundary between segments 60. The third segment 66a may hold minutes three to five, and is repeated (as segments 66b, 66c, and so forth) on channel three with segments 66 aligned with segment 64.

The fourth channel may be used to broadcast segment 68a holding minutes five through nine repeated (as segments 68b, 68c, and so forth) with boundaries between segments 68 aligned with every other boundary between segments 66 (and 64). The fifth channel broadcasts segment 70a holding minutes nine through thirteen repeated (as segments 70b, 70c, and so forth) with boundaries between segments 70 aligned with segments 68.

Channels six, seven, and eight provide, respectively, minutes thirteen through twenty-one, via segments 72, minutes twenty-one through twenty nine, via segments 74, and minutes twenty-nine through thirty-seven, via segments 76. The boundaries of each of these latter equal-sized segments are aligned with each other and with every other boundary between segments 68 of channel four.

Referring also to FIG. 1, a consumer requesting to view the program of the segments 60, 64, 66, 68, 70, 72, 74, and 76 at a time $t_1$ waits briefly for the beginning of segment 60a and begins playing the content of segment 60 on the television monitor 35 (shown in FIG. 1) as received from channel zero. At the conclusion of that segment 60a, the receiver 30 is programmed to switch to channel one to begin playing segment 64a. At conclusion of segment 64a, the receiver 30 switches to channel two and begins playing segment 66a. This process of switching channels is repeated to play segment 68a, 70a, 72a, 74a, and 76a and thus to play the entire program. The segments 60a, 64a, 66a, 68a, 70a, 72a, 74a and 76a make up a program thread 71 (indicated also by shading) which complete without gap a transmission of the program.

A similar program thread (not shaded) may be constructed starting at segment 60b. In this case, as segment 60b is played by the receiver 30, segment 64a is recorded or buffered into the receiver's memory 38. The buffering process then merges with the program thread 71 to follow the same sequence of segments as previously described recording segments 66a, 68a, 70a, 72a, 74a and 76a, while the receiver 30 plays the video shortly behind its recording into memory 38.

The buffering allows different initial segments 60a through 60h to all serve requests from different consumers, and thus provide of the video program, and yet all to eventually merge with the final segment 76a for reduced bandwidth delivery. At most, only one channel must be buffered for any program thread.

As all program threads eventually merge at segments 76, a cluster 80 (bounded by dashed lines and only partially shown in FIG. 4) may be defined as the collection of all segments 60, 64, 66, 68, 70, 72, and 74 having one of segments 72 in common. As a general rule, once an individual first segment 60a of a cluster 80 is allocated, except for minor channel stealing as described above, the remaining segments 64, 66, 68, 70, 72 must be reserved for the given program because the threads of other segments of the cluster eventually merge. Nevertheless, a first segment 60i outside of the cluster 80 may be allocated to a different program as it will eventually merge to a different final segment 76.

Each cluster exhibits a catch-up window 90 equal generally to the time width of the segments 60a through 60g forming the top segment layer of the cluster 80. For a request to be serviced by a cluster that has already started, it must arrive at a time from the first segment 60a to immediately prior to the last segment 60h.

Figure 5:
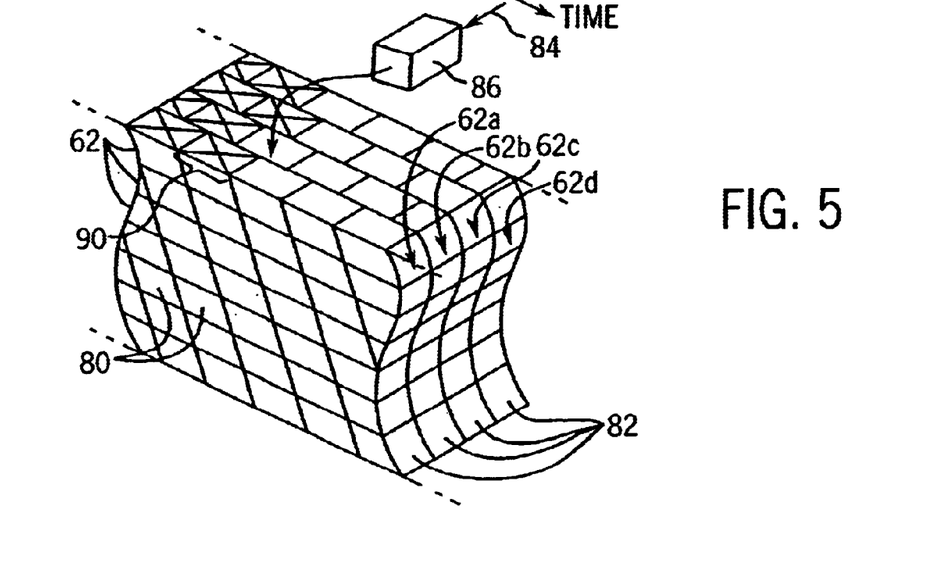
FIG. 5 is a three-dimensional perspective view of implementation of the skyscraper delivery system of FIG. 4 for multiple blocks, each which may hold a different program showing a persistent staggering of the clusters of the blocks to facilitate the allocation of new requests to clusters on a real-time basis.

Referring now to FIG. 5, different sets of channels 62a, 62b, 62c, and 62d may be arranged in blocks 82 with a staggering in time of their respective clusters 80. As a given request 84 is received, an allocation routine 86 may review clusters 80 in any of the blocks 82 whose catch-up windows 90 embrace the request time.

If the client requests a program that is not currently allocated to a cluster 80, the next free cluster 80 is allocated to the requested program. Clusters 80 assigned to a program are identified in FIG. 5 by X's spanning the catch-up window 90 on the upper face of the clusters 80. Otherwise the client request is allocated to the existing cluster serving that program.

B. An Efficient Data Transfer Technique

In operation, it is recognized that a cost is associated with the storage of continuous media data. Typically, storage costs increase as the amount of stored data increases. There may also be costs associated with the transfer of the programs from the regional server 48b and remote server 48a, and in particular the cost to transmit data from the remote server may be greater than the cost to transmit the same data from the regional server. In this case, referring to FIG. 6, when multiple regional servers 48(b-f) are accessed by clients requesting that a media program be sent, a tradeoff exists between storing the program data at multiple regional servers and transmitting the data from the regional servers, and storing the data remotely, and transmitting the data from the remote server. While storing the data regionally will decrease the cost to transmit the data, the cost of storing the data at more than one regional server may negate the savings associated with the relatively low transmission costs. However, while storing the data remotely will reduce storage costs because the data need only be stored at one location, the savings from data storage may be negated by the costs associated with long distance data transmission.

Figure 6:
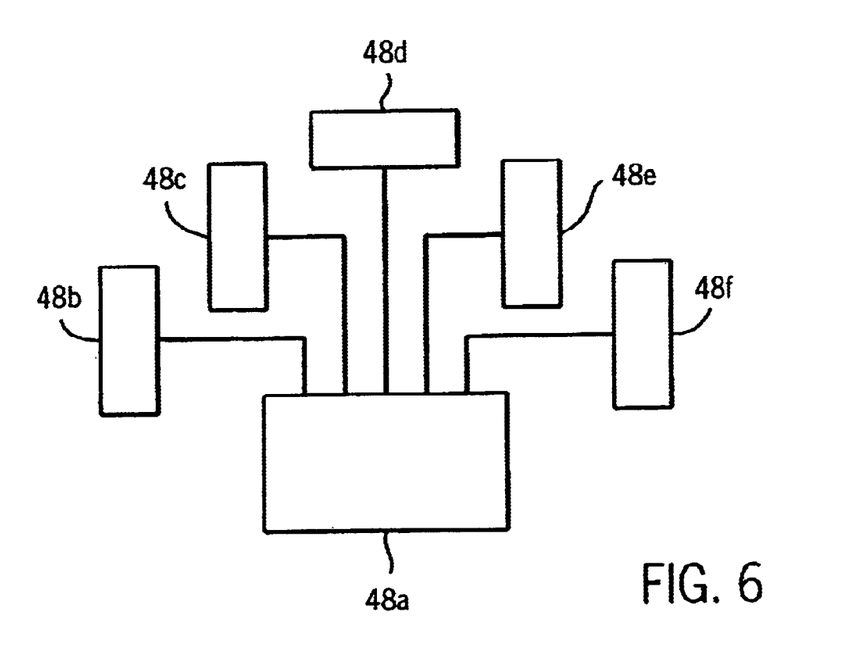
FIG. 6 is a schematic diagram of a remote server in communication with a plurality of regional servers.

The present inventors have recognized that in some cases, it is desirable to break the program data into two groups of data, a prefix and a suffix, to allow the storage and transmission burden of the channels to be divided among a regional server 48b and a remote server 48a per the channel group interface 92. In the preferred embodiment of dynamic skyscraper delivery, this involves partitioning the data segments into a leading group of segments and a trailing group of segments, wherein leading group of segments will be allocated to the regional server 48b to reduce transmission cost, and the segments of the trailing group 96 will be allocated to the remote server 48a to reduce storage cost. The trailing group, as opposed to the leading group, is allocated to the remote server 48a because the cost of storing and transmitting the trailing groups at multiple regional servers is greater than the cost to store those groups remotely and transmit them via long distance in this example, as will be illustrated below with reference to Tables 1A and 1B. When the two groups of segments are allocated to different servers, the need for precise alignments between the channels of each group is relaxed so that delivery of the trailing group cluster can be scheduled earlier and buffered at the client to facilitate the switchover between the two transmission groups. For the purposes of illustration and clarity, the leading and trailing groups 94 and 96, respectively, are broken between the groups of the first three channels and next five data channels in accordance with the illustrated embodiment, as will now be described.

It should be appreciated that even though the remote server 48a is transmitting to the clients of five regional servers 48(b-f) as illustrated in FIG. 6, some of the transmissions will be shared multicasts, due to the multicast stream merging method in use.

The example may be simplified by assuming that storage and regional transmission costs are the same from one location to the next, and that remote transmission costs are constant regardless of the time of day. Additionally, the cost for transmitting the data from the remote server assumes any additional regional charges that may incur should the remote server 48a send the data to the given clients via a regional server for the client 48(b-f). Finally, for the purposes of this illustrative example, it will be assumed that the leading segment cluster has the same duration on each channel as the tailing segment cluster, as shown in FIG. 4, although more efficient delivery of the leading segment cluster is described in a co-pending patent application entitled "Method for Reduced Bandwidth for On-Demand Data Streaming Using Mini-Clusters" filed concurrently herewith, the disclosure of which is hereby incorporated by reference. It will become apparent to those having ordinary skill in the art that as these assumptions are negated, while the simplified example, described immediately below, becomes more complicated, the theory of operation, as will be explained in more detail below in section C, nonetheless remains valid.

In this simplified example, the storage cost for one minute of data (S) is $0.02 for the length of the transmission cluster, the regional network bandwidth cost for one minute of data ($T_L$) is $0.01, and the remote network bandwidth cost for one minute of data ($T_R$) is $0.085. Again, it should be appreciated that these variables and corresponding values are being used to demonstrate the theory of the preferred embodiment only. As a result, to calculate the total cost to store and transmit a given set of program segments at a particular server, two primary costs will be involved: the cost to store the data, and the cost to transmit the data. The cost to store data for a given set of program segments is equal to the total size of the segments (B) times the storage cost, while the cost to transmit the data is equal to the total bandwidth used to transmit the segments during a cluster (TB) times the bandwidth cost. For example, for the first program segment to be broadcast by a given server, only one minute of data need be stored (B=1), however transmission costs for 8 minutes total bandwidth are incurred for each cluster that is scheduled to deliver the program (TB=8), assuming that a sufficient frequency of client requests exist to necessitate all segment re-transmissions 60(a-h) in the channel. As illustrated in the cluster of FIG. 4, the total bandwidth (TB) per channel is 8 minutes in this instance of the preferred embodiment. The total cost of storing and transmitting data for all segments that are transmitted regionally are multiplied by the total number of regional servers (L).

Accordingly, the total cost to store and transmit the first segment of data locally ($TC_L$) may be represented by the following equation:

$$TC_L = L^*[(S^*B)+(TB^*T_L)] \quad (1)$$

Therefore, the cost of storing and transmitting the first segment regionally is 5[$0.02*1)+(8*$0.01)]=$0.50. The total cost to store and transmit the first segment of data remotely ($TC_R$) may be represented by the following equation:

$$TC_R = [(S^*B)+(TB^*T_R)] \quad (2)$$

If segments 2–8 are stored and transmitted remotely, the cost is [($0.02*36)+(56*$0.085)]$5.48 The total cost (TC) for broadcasting the data file is therefore simply the summation $TC_L + TC_R$. The results for all possible combinations where the leading group is allocated to the regional servers, and the trailing group is allocated to the remote server are illustrated below in Table 1A.

TABLE 1A

| Segments transmitted regionally | Segments transmitted remotely | TCL | TCR | TC |
|---|---|---|---|---|
| 0 | 1-8 | $0 | $6.18 | $6.18 |
| 1 | 2-8 | $.5 | $5.48 | $5.98 |
| 1-2 | 3-8 | $1.10 | $4.76 | $5.86 |
| 1-3 | 4-8 | $1.70 | $4.04 | $5.74 |
| 1-4 | 5-8 | $2.50 | $3.28 | $5.78 |
| 1-5 | 6-8 | $3.30 | $2.52 | $5.82 |
| 1-6 | 7-8 | $4.50 | $1.68 | $6.18 |
| 1-7 | 8 | $5.70 | $.84 | $6.54 |
| 1-8 | 0 | $6.90 | 0 | $6.90 |

Table 1B illustrates the increased costs when trailing, as opposed to leading, data is allocated to the regional servers, and leading data is allocated to the remote servers. These tables therefore provide an illustration of cost savings in allocating the leading data to the regional servers.

TABLE 1B

| Channels broadcast locally | Channels broadcast remotely | TCL | TCR | TC |
|---|---|---|---|---|
| 1-8 | 0 | $6.90 | $0 | $6.90 |
| 2-8 | 1 | $6.4 | $.7 | $7.1 |
| 3-8 | 1-2 | $5.8 | $1.42 | $7.22 |
| 4-8 | 1-3 | $5.20 | $2.14 | $7.34 |
| 5-8 | 1-4 | $4.4 | $2.9 | $7.3 |
| 6-8 | 1-5 | $3.6 | $3.66 | $7.22 |
| 7-8 | 1-6 | $2.4 | $4.5 | $6.9 |
| 8 | 1-7 | $1.2 | $5.34 | $6.54 |
| 0 | 1-8 | $0 | $6.18 | $6.18 |

As was discussed above, efficiency of the data transmission is optimized when the leading: group (or prefix) is allocated to the regional servers, and the trailing group (or suffix) is allocated to the remote server. More particularly, with reference to the present set of parameters, the best prefix with respect to minimizing total delivery cost may be identified with reference to Table 1A as segments 1–3, while the suffix to be stored at the remote server comprises channels 4–8. Splitting the program data in this manner minimizes the cost incurred to transmit the entire file to a plurality of clients at a plurality of locations.

It should be appreciated that as a practical matter, cost may be incurred for storage at the remote server even when the data is also stored at all regional servers. Further, more, the remote and regional transmission costs might be based on relative demerits assigned for placing load on the remote server and network versus providing the corresponding transmission bandwidth at the regional server, respectively, to reflect the desirability versus cost of providing better service to clients by offloading the remote server. While the data may be different in these scenarios, an optimization is nonetheless attainable under the theory described above for a given number of regional servers. It should additionally be appreciated that storage costs may not always increase linearly with increasing amount of storage data, that transmission costs in general depend on the frequency of client requests, that storage costs generally occur over longer periods of time than the duration of a single dynamic skyscraper transmission cluster, and that a different stream merging method than dynamic skyscrapering might be employed. In each of these scenarios the optimization is attainable using cost formulas that follow the same principles as the above and that can be derived by one having ordinary skill in the art. It should further be appreciated that, depending on the values of various parameters, the leading group 94 and trailing group 96 may be divided in different manners so as to optimize the efficiency of a given program and regional server on a case-by-case basis. Alternatively, the optimal break between the leading and trailing groups for a plurality of programs and regional servers could be determined to enable a general protocol for all programs, which would eliminate the need to determine the leading and trailing groups on a case-by-case basis.

In some cases, a predetermined amount of cache storage space will be available at some of the regional servers. In this case the optimal combination of program prefixes and full programs that should be stored at the regional server to minimize total transmission costs can be computed using similar principles to the principles in the simple example above. This will now be described in more detail below.

C. A Preferred Optimized Data Caching Technique

The above simplified example may be generalized using an optimization model for multiple programs that permits calculation of the collection of prefixes and full programs that should be cached at each regional (or proxy) server in order to minimize delivery cost for a given skyscraper configuration. For this purpose, the set of optimization model parameters will now be set forth and defined with reference to Table 2.

TABLE 2

| Parameter | Definition |
|---|---|
| Input | |
| k | Number of segments in the leading segment set |
| K | Number of segments per object |
| N | Number of objects |
| N | Number of groups of skyscraper channels |
| $N_{channels}$ | Maximum number of channels at each regional server |
| $N_{segments}$ | Storage capacity(measured in number of unit-segments) at each regional server |

TABLE 2-continued

| Parameter | Definition |
|---|---|
| P | Number of regional servers |
| $s_j$ | Size of the j'th segment (relative to the size of the first) |
| $T_1$ | Duration of a unit-segment transmission |
| W | The largest segment size in the leading segment set |
| w | The largest segment size in the trailing segment set |
| β | The cost of a regional server channel, relative to that of a remote server channel |
| $\lambda_i$ | The cost of a regional server channel, relative to that of a remote server channel total arrival rate of request for object i |
| Output | |
| C | total number of channels devoted to skyscraper multicasts |
| $C_{remote}$ | number of channels needed for remote server multicasts |
| $C_{regional}$ | number of channels needed for regional server multicasts |
| $D_{regional}$ | storage needed at each regional server, in number of unit-segments |
| $X_i^{1,R}, X_i^{1,p},$ $X_i^{1,r}, X_i^{1,R},$ $X_i^{1,p}, X_i^{1,r}$ | maximum rate at which transmission clusters can be allocated for multicasts of the leading/trailing (l/t) segment set for object i, distinguished by whether the segments of the object are only stored at the remote server (R), are partially cached at the regional servers (p), or are fully cached at the regional servers (r) |
| $\theta_i^R$ | equals 1 if object i is stored only at the remote server; 0 otherwise |
| $\theta_1^p$ | equals 1 if only the leading segment set of object i is cached regionally; 0 otherwise |
| $\theta_1^r$ | equals 1 if object i is entirely cached regionally; 0 otherwise |

The estimate of required bandwidth is developed first for the simpler context of a dynamic skyscraper system that does not have regional servers and does not use miniclusters to improve performance (i.e., k=0). Letting C*=K× N* denote the estimate of the required number of channels, and $\lambda_i$ denote the rate of requests for object i, we obtain:

$$C^* = K \times N^* = K \times WT_1 \sum_{i=1}^{n} \frac{1}{\left((W-1)T_1 + \frac{1}{\lambda_i}\right)} \quad (3)$$

The factor $WT_1$ is the duration of a transmission cluster on each channel. The i'th term in the sum is the inverse of the average time between transmission clusters that deliver object i, assuming requests for a new transmission clusters have zero wait time (or an infinite number of channels are available), and assuming that the average arrival rate of requests for the object when a transmission cluster is not available for catch-up is equal to the overall average arrival rate. (Note that the latter assumption implies that $1/\lambda_i$ is the average time from the end of a transmission cluster catch-up window for object i until the next request for that object.) Thus, the i'th term gives the allocation rate for new transmission clusters for object i if an infinite number of channels is available. Summing over all objects that use skyscraper multicasts gives the total maximum allocation rate, and multiplying this maximum allocation rate by the duration of a transmission cluster gives the average number of groups of channels that would be in use if an infinite number of groups were available. Multiplication by the number of channels per group gives an estimate of the total number of channels that should be provided.

The specific optimization problem considered is that of determining the regional cache contents that minimize the overall cost of delivery, as represented by a weighted sum of the required number of channels at the remote server and at each regional server, subject to constraints on the bandwidth and storage capacity at each regional server.

The optimization model parameters are defined in Table 2. Outputs $\theta_i$ are the values that specify whether object i should be cached (fully or partially) at the regional servers.

It is assumed that all objects have the same segmentation parameters (K, W, k, w), and that each object can have O, k or K segments stored regionally. It is also assumed that the regional sites are homogeneous in storage and bandwidth capabilities, as well as in client request rates and object selection frequencies, and thus, that all of the regional servers will store the same segments/objects. These assumptions simplify the exploration of the system design space and are thus appropriate for gaining initial insights. The model can easily be modified to include more general formulations in the future.

With the above notation and assumptions, the optimization problem is formally described as follows:

$$\min_{\theta} \ C_{remote}(\theta) + P\beta C_{regional}(\theta)$$

subject to $C_{regional}(\theta) \leq N_{channels}$ $D_{regional}(\theta) \leq N_{segments}$ $\theta_i^R + \theta_i^P +, \theta_i' i=1,2,\ldots, n;$ $\theta_i^R, \theta_i^P, \theta_i' \in \{0,1\}, i=1,2,\ldots, n,$ Here the notation $\theta$ represents the vector whose components $\theta_i^R, \theta_i^P, \theta_i^r, =1, 2, \ldots, n$.

Solution of this optimization model uses a method of computing the number of channels needed at the remote server as well as at each regional server, as a function of the client workload (i.e., request arrival rates for each object), the partitioned skyscraper configuration, and the object segments cached at the regional servers. To compute these channel estimates, we use the basic approach that was used in Section 4.1, entailing finding the maximum allocation rates of new (mini- and trailing segment) transmission clusters, assuming an infinite number of channels is available.

The maximum allocation rate for new transmission clusters in a system with no regional caching and no mini-clusters is the inverse of the average time between requests for a new transmission cluster when there is no queuing, as given by, $$(W-1)T_1 + \frac{1}{\lambda_i}.$$

The maximum allocation rates for trailing segment set transmission clusters in the partitioned dynamic skyscraper architecture are given by similar expressions that depend on whether the transmission cluster is delivered by the remote (R) or regional (r) server. If the multicast uses mini-clusters of size k segments, the duration of the total catch-up window for trailing segment set clusters is $$W - s_{k+1} + \sum_{j=1}^{k} s_j.$$

Noting that $\lambda_i$ lP is the arrival rate of client requests for object i at a regional server, the maximum allocation rates for trailing segment set clusters are as follows:

$$X_i^{t,R} = X_i^{t,P} = \frac{1}{\left(W - s_k + 1 + \sum_{j=1}^{k} s_j\right)T_1 + \frac{1}{\lambda_i}} \quad (4)$$

$$X_i^{t,r} = \frac{1}{\left(W - s_k + 1 + \sum_{j=1}^{k} s_j\right)T_1 + \frac{P}{\lambda_i}} \quad (5)$$

The maximum allocation rates for mini-clusters are further complicated by the fact that the min-catch-up window for such a cluster has a variety of possible lengths, depending on when the mini-cluster begins in relationship to the end of the catch-up window of the corresponding trailing segment set transmission cluster. To compute the average catch-up window size for mini-clusters for object i, we make two assumptions. First, we assume that the average arrival rate of mini-cluster requests for object i during the last $wT_1$ of the catch-up window of an object i tailing segment set transmission cluster is equal to the overall average arrival rate of mini-cluster requests for that object. This implies that the fraction of mini-clusters for object i that will begin during this time period is given by $wT_1$ times the allocation rate of object i trailing segment set transmission clusters. Second, we assume that such arrivals may occur anywhere within this time period with equal probability. Thus, the average catch-up window size of the corresponding mini-clusters is given $$\frac{w-1}{2}T_1.$$

All other mini-clusters have a full catch-up window of size $(w-1)T_1$. The three mini-cluster allocation rates are therefore given by $$X_i^{t,r} = \frac{1}{\left(X_i^{t,r}wT_1\frac{w-1}{2} + (1-X_i^{t,r}wT_1)(w-1)\right)T_1 + \frac{P}{\lambda_i}} \quad (6)$$

the following equations.

$$X_i^{t,P} = \frac{1}{\left(X_i^{t,P}wT_1\frac{w-1}{2} + (1-X_i^{t,P}wT_1)(w-1)\right)T_1 + \frac{P}{\lambda_i}} \quad (7)$$

$$X_i^{t,R} = \frac{1}{\left(X_i^{t,R}wT_1\frac{w-1}{2} + (1-X_i^{t,R}wT_1)(w-1)\right)T_1 + \frac{1}{\lambda_i}} \quad (8)$$

Multiplying each of the above allocation rates by the duration of, and number of channels in, a transmission cluster of the corresponding type, yields an estimate for the number of channels required for that particular type of transmission cluster. For specific object segment allocations, as reflected through the $\theta_i$ values, the required number of channels and regional storage can thus be computed as follows:

$$C_{remote}(\theta) = \sum_{i=1}^{n}(\theta_i^R X_i^{t,R} + \theta_i^P X_i^{t,P}(K-k)WT_1 + \theta_i^R X_i^{t,R}kwT_1 \quad (9)$$

-continued $$C_{regional}(\theta) = \sum_{i=1}^{n} \theta_i^r X_i^{t,R} + (K-k)WT_1 + \theta_i^r X_i^{t,R} + \theta_i^p X_i^{t,P} kwT_1 \quad (10)$$

$$D_{regional}(\theta) = \sum_{i=1}^{n} (\theta_i^r + \theta_i^p) \sum_{j=1}^{k} s_j + \theta_i^t \sum_{j=k+1}^{K} s_j. \quad (11)$$

The above equations estimate the required number of channels (or disk I/O and network I/O bandwidth) at each type of server, assuming the network supports multicast or broadcast delivery. This is also the number of network channels required for the remote (or regional) multicasts if the respective server is operating over a broadcast network such as a satellite or cable network, Recall that the required regional network bandwidth is not affected by whether the objects are stored at the remote or regional server. Thus the only extension that is needed to make the model precise for a switched network is to factor in the average remote network bandwidth required to multicast each object.

There are several points worth noting about the model. First, the model is valid for multiple remote servers if each stores a distinct subset of the objects in the system and if the network used by each remote server has the same cost for the same required bandwidth. In this case $C_{remote}$ is the aggregate number of channels that must be provided at the collection of remote servers. Second, the model can be generalized for heterogeneous regional servers by developing separate calculations, similar to those given above, and summing over the appropriate objects, for each distinction regional server. Third, $C_{remote}$, $C_{regional}$, and $D_{regional}$ are linear functions of the binary variables θ. Thus, the optimization model is a mixed integer linear program (MIP), for which reliable solution techniques exist.

While the techniques described above have been illustrated in combination with the scyscrapering merging technique, they may be easily implemented with other data transfer techniques. For example, in a patent application entitled "Method for On-Demand Data Streaming" filed concurrently herewith and hereby incorporated by reference, a data transfer technique is disclosed having a fixed or dynamic merger hierarchy. In particular, a first transmission of the streaming data file begins at a time of a first client request, a second transmission of the streaming data file begins at the time of a second client request, and a third transmission of the streaming data file begins at the time of a third client request during the first transmission. The second and third transmissions are merged with each other prior to their merger with the first transmission. The hierarchical data transfer technique may be desirable, for example, where a low number of client requests exist for a given streaming data file.

In this embodiment, a program prefix will be stored at each regional server, and the remaining suffix will be stored at the remote server. The size of the prefix will be determined based on the above-described principles described, as should be appreciated by one having ordinary skill in the art, as the local storage costs will be balanced against the long distance costs for transmitting the data. An improved, or alternatively optimal, determination of prefix size may then be achieved. Alternatively, the above model may be used to determine, given a plurality of regional servers having various storage capabilities, the desired amount of storage to improve, or optimize, cost efficiency.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of improving an efficiency of transmitting a continuous media program on-demand to multiple consumers, wherein the media program is transmitted from at least one regional storage location serving a corresponding plurality of consumers and a remote storage location in communication with the at least one regional storage location, in response to a plurality of consumer requests, the method comprising:
    (a) splitting the program into a prefix and a suffix as a function of at least 1) costs associated with storing the prefix at the at least one regional storage location and 2) costs of transmitting the suffix from the remote storage location;
    (b) storing the prefix in the at least one regional storage location;
    (c) storing the suffix in the remote storage location;
    (d) transmitting the prefix to the plurality of consumers from the corresponding at least one regional storage location; and
    (e) transmitting the suffix to the plurality of consumers from the remote storage location.

2. The method as recited in claim 1, further comprising transmitting the prefix and suffix continuously.

3. The method as recited in claim 2, wherein the prefix comprises a leading group of segments, and wherein the suffix comprises a trailing group of segments.

4. The method as recited in claim 3, wherein the prefix and suffix are chosen so as to reduce the combined storage and bandwidth costs associated with transmitting an entire given media program to the plurality of clients.

5. The method as recited in claim 4, wherein the prefix and suffix are chosen so as to average down the combined storage and bandwidth costs associated with transmitting a plurality of media programs to the plurality of clients.

6. The method of claim 1, wherein the continuous media program is transmitted in accordance with a skyscrapering technique.

7. The method as recited in claim 1, wherein the prefix and suffix comprise a plurality of sequential segments of data.

8. The method as recited in claim 7, wherein the segments of the prefix are smaller than the segments of the suffix.

9. The method as recited in claim 1, wherein the media program may be transmitted via at least one of phone lines, cable systems, broadcast radio, and satellite links.

10. The method as recited in claim 1, wherein the prefix and suffix are further split as a function of costs associated with transmitting the prefix.

11. The method as recited in claim 1, wherein the prefix and suffix are further split as a function of costs associated with storing the suffix.

12. A method of reducing operation costs of an on-demand media file delivery system, wherein the media file is transmitted, from at least one of a plurality of regional storage locations and a remote storage location located remotely from the plurality of regional storage locations, in response to a plurality of client requests, the method comprising:
    (a) splitting the media file into a fixed prefix and a fixed suffix;
    (b) storing the prefix at the at least one regional storage location;
    (c) storing the suffix at the remote storage location;

(d) transmitting the prefix to the plurality of clients from the at least one regional storage location; and (e) transmitting the suffix to the plurality of clients from the remote storage location.

13. The method as recited in claim 12, wherein the prefix and suffix are further determined so as to reduce the storage costs of the prefix, and to reduce the transmission costs of the suffix.

14. A method of improving an efficiency of transmitting a plurality of continuous media program on-demand to multiple consumers, wherein the media programs are transmitted from at least one regional server serving a corresponding plurality of consumers and a remote server in communication with the at least one regional server, in response to a plurality of consumer requests, the method comprising:

(a) splitting the programs into prefixes and a suffixes as a function of at least 1) costs associated with storing the prefixes at the at least one regional storage location and 2) costs of transmitting the suffix from the remote storage location;

(b) storing some of the prefixes in the at least one regional server;

(c) storing some of the suffixes in the remote server;

(d) transmitting the prefix of a requested media program to a plurality of requesting consumers from the corresponding at least one regional server; and (e) transmitting the suffix of the requested media program to the plurality of requesting consumers from the remote server.

15. The method as recited in claim 14, wherein the prefix of the requested media program is empty, and the suffix comprises the entire media program.

16. The method as recited in claim 14, wherein the suffix of the requested media program is empty, and the prefix comprises the entire media program.

17. The method as recited in claim 14, wherein the prefixes and suffixes are determined for the plurality of media programs based at least in part on popularity levels of the media programs.

18. The method as recited in claim 14, wherein the prefixes and suffixes may be chosen according to the optimization model:

$$\min_{\theta} C_{remote}(\theta) + P\beta C_{regional}(\theta)$$

wherein:

$C_{remote}$ is a number of channels for remote server multicasts;

$C_{regional}$ is a number of channels for regional server multicasts;

P is a number of regional servers;

β is a cost of a regional server channel, relative to that of a remote server channel, and θ represents whether one of all and a portion of an object are stored at least at one of the regional and remote servers.

19. The method as recited in claim 14, wherein the model is subject to the conditions of:

$C_{regional}(\theta) \leq N_{channels}$;

$D_{regional}(\theta) \leq N_{segments}$;

$\theta_i^R + \theta_i^P +, \theta_i^r =, 1, i=1,2, \ldots, n$; and $\theta_i^R, \theta_i^P, \theta_i^r \in \{0,1\}, i=1,2,\ldots,n,$ wherein:

i is the media program;

$D_{regional}$ defines storage needed at each regional server;

$\theta_i^R$ has a value of 1 if the media program is stored only at the remote server, and has a value of 0 if the media program is not stored at the remote server;

$\theta_i^P$ has a value of 1 if the prefix is stored at the regional server, and has a value of 0 if the prefix is not stored at the regional server;

$\theta_i^r$ has a value of 1 if the entire media file is stored regionally, and has a value of 0 if the entire media file is not stored regionally;

$N_{channels}$ is a maximum number of channels at each regional storage location; and $N_{segments}$ is a storage capacity at each regional server.

20. The method as recited in claim 12, wherein the prefix and suffix are determined so as to reduce costs associated with transmitting the media file to the plurality of clients.

* * * * *

UNITED STATES PATENT AND TRADEMARK OFFICE
CERTIFICATE OF CORRECTION

PATENT NO. : 6,868,452 B1
DATED : March 15, 2005
INVENTOR(S) : Derek L. Eager et al.

It is certified that error appears in the above-identified patent and that said Letters Patent is hereby corrected as shown below:

Column 6,
Line 2, "tying" should be -- lying --

Column 10,
Line 64, "leading: group", ":" (semi-colon) should be deleted

Column 11,
Line 9, "Further, more" should be -- Furthermore --

Column 13,
Line 47, in "given by," "," (comma) should be deleted
Line 65, "1P is the arrival rate" should be -- /P is the arrival rate --

Column 14,
Equation 7, " $-X_i^{l,P}=$ " should be -- $X_{\frac{l}{i},}^{\phantom{l}P}$ --

Equation 8, " $-X_i^{l,R}=$ " should be -- $X_{\frac{l}{i},}^{\phantom{l}R}$ --

Equation 9, " $-{}_1+\theta_i^R X_i^{l,R} kwT_1$ " should be -- ${}_1+\theta_i^R X_i^{l,R} kwT_1$ --

Column 15,
Equation 10, " $-+\theta_i^P X_i^{l,P} kwT_1$ " should be -- $+\theta_i^P X_i^{l,P} kwT_1$ --

UNITED STATES PATENT AND TRADEMARK OFFICE
CERTIFICATE OF CORRECTION

PATENT NO. : 6,868,452 B1
DATED : March 15, 2005
INVENTOR(S) : Derek L. Eager et al.

It is certified that error appears in the above-identified patent and that said Letters Patent is hereby corrected as shown below:

<u>Column 18,</u>
Line 20, "$C_{regional}(\theta) \leqq N_{channels};$" should be -- $C_{regional}(\theta) \leq N_{channels};$ --
Line 21, "$C_{regional}(\theta) \leqq N_{segments};$" should be -- $C_{regional}(\theta) \leq N_{segments};$ --

Signed and Sealed this

Thirty-first Day of May, 2005

JON W. DUDAS
*Director of the United States Patent and Trademark Office*